United States Patent [19]

Waszkiewicz

[11] Patent Number: 5,781,902
[45] Date of Patent: Jul. 14, 1998

[54] METHOD, COMPUTER PROGRAM PRODUCT, AND SYSTEM FOR EXTENDING THE CAPABILITIES OF AN EXISTING PROCESS TO STORE AND DISPLAY FOREIGN DATA

[75] Inventor: Edward Paul Waszkiewicz, Redmond, Wash.

[73] Assignee: Microsoft Corporation, Redmond, Wash.

[21] Appl. No.: 678,968

[22] Filed: Jul. 12, 1996

[51] Int. Cl.$^6$ .................................................. G06F 17/30
[52] U.S. Cl. ...................... 707/10; 707/104; 395/200.33; 395/200.47; 395/200.49
[58] Field of Search ................................ 707/101, 1, 200, 707/103, 10, 104; 395/326, 54, 200.33, 200.47, 200.49

[56] References Cited

U.S. PATENT DOCUMENTS

| | | | |
|---|---|---|---|
| 5,050,078 | 9/1991 | Sansone | 364/406 |
| 5,278,955 | 1/1994 | Forte et al. | 395/200 |
| 5,379,366 | 1/1995 | Noyes | 395/54 |
| 5,493,607 | 2/1996 | Arymainayagam et al. | 379/88 |
| 5,526,518 | 6/1996 | Kashio | 707/101 |
| 5,548,753 | 8/1996 | Linstead et al. | 707/1 |
| 5,594,837 | 1/1997 | Noyes | 395/63 |
| 5,600,833 | 2/1997 | Seen et al. | 707/1 |
| 5,604,788 | 2/1997 | Tett | 379/58 |
| 5,613,108 | 3/1997 | Morikawa | 707/200 |
| 5,623,011 | 4/1997 | Landfield et al. | 395/326 |
| 5,625,670 | 4/1997 | Campana, Jr. et al. | 379/58 |
| 5,625,816 | 4/1997 | Burdick et al. | 707/103 |
| 5,644,706 | 7/1997 | Ruigrok et al. | 395/185.01 |
| 5,712,901 | 1/1998 | Meermans | 379/88 |
| 5,712,903 | 1/1998 | Bartholomew et al. | 379/89 |

OTHER PUBLICATIONS

Alfonzetti et al, Designing a gateway between teletex and OSI networks by means of SDL, IEEE pp. 484–493, Apr. 1989.

Racke et al, Extending an existing mail service to support X.400 message handling, IEEE, pp. 245–253, Apr. 1988.

Linn et al, Application of formal description techniques to the specification of distributed test systems, IEEE, pp. 96–109, Mar. 1988.

Rotzal, X.400 message handling system: the remote user agent, IEEE, pp. 433–437, Nov. 1995.

Deokjai et al, Issues in enterprise e-mail management, IEEE, pp. 78–82, Apr. 1996.

Patel et al, The multimedia fax-MIME gateway, IEEE, pp. 64–70, Feb. 1994.

Smith, A secure Email gateway, IEEE, pp. 202–211, Dec. 1994.

Lee, The impact of CCITT message handling systems structure on performance, IEEE, pp. 28–33, Sep. 1990.

*Primary Examiner*—Thomas G. Black
*Assistant Examiner*—Frantz Coby
*Attorney, Agent, or Firm*—Workman, Nydegger & Seeley

[57] ABSTRACT

A method, computer program product, and system that extends the capabilities of an existing process to manipulate foreign data so that it may be displayed and modified. The foreign data block is retrieved from a storage location by either an existing program or a program extension module. Once retrieved, the foreign data block is passed or otherwise communicated to a program extension module for interpretation of the data stored therein. Further, the program extension module will communicate with the existing program through a defined interface user interface information so that the existing program's user interface may be used to display the individual data elements of the foreign block of data. Once the existing program has the user interface information, the data elements from the foreign data block, and the association information, a complete user interface is displayed by the existing program that may be modified by system administrator. If data elements are modified through the user interface, the existing program will pass such modified data elements to the program extension module for compilation into a newly modified foreign data block. Finally, either the program extension module or the existing program will store the foreign data block into the requisite storage location.

20 Claims, 5 Drawing Sheets

METHOD, COMPUTER PROGRAM PRODUCT, AND SYSTEM FOR EXTENDING THE CAPABILITIES OF AN EXISTING PROCESS TO STORE AND DISPLAY FOREIGN DATA

BACKGROUND OF THE INVENTION

1. The Field of the Invention

This invention relates to methods and apparatus for extending the capabilities of existing systems to accommodate foreign data. More particularly, this invention relates to methods, computer program products, and systems that allow an existing process or system to have its user interface extended and controlled in order to display and modify foreign data.

2. Present State of the Art

Modern complex hardware/software systems in many instances are designed so that third-party software components may integrate therewith in order to access system functionality and provide solutions. Some common examples of such systems are operating systems, network operating systems, network communication applications, etc.

One particularly illustrative example would be a network mail server system and will be used as an example throughout this application. Because electronic mail or "e-mail" messages come in many different formats and varieties, such network mail systems will provide facility for "gateways" to be written in order to translate the different formats from and to the native mail system format. Additionally, developers of network mail systems will write gateways for their format to be integrated with other systems.

A gateway, when used in the network mail system context, is simply a translation program that receives mail messages in one format and converts them into mail messages of the native system format. Conversely, the gateway translates native mail messages into another format for sending such messages to another system. Such gateways are typically third-party program products or components to the native networks mail system that are created after the native network mail system has been in existence and made available. One example of a network application that supports e-mail, as well as other facilities, is the Microsoft® Exchange™ System.

One problem encountered with third-party gateway development revolves around modifying configuration data for that gateway. It is common for a gateway, or other type of third-party component used in a network mail and communications system, to have configuration parameters and other information that is specific to the gateway implementation and is not known to the native network communications system. Such "foreign data" may arise out of the foreign format between which translation will take place, the desired detail of administrator control written into the gateway, other implementation details, etc.

In many instances, the configuration data is stored as a file accessible to the gateway itself and is modified by the system administrator through a stand alone configuration program created by the third-party developer. Storing the gateway configuration data as a separate file forces the configuration program and the gateway to reside on the same machine or in directly connected machines, which can be a disadvantage in common distributed systems. Though the configuration file could be conceivably stored on the network and therefore be accessible, it still leaves limitations in a distributed system.

System administrator inconvenience and inefficiency also occur when the system administrator must use two different programs in order to configure and manage a gateway. The main system administrator program must be used in order to manage the gateway and store configuration data common to all gateways that may be installed on a system, while a second program must be used to modify the implementation-specific gateway configuration data itself. The second gateway configuration program is supplied by the third-party developer since the main administrator program for the system has no understanding or knowledge of the foreign implementation-specific gateway configuration parameters.

Potentially, a system administrator would need to learn many different administrator programs besides the main system administrator program since each gateway or other third-party system component could theoretically have its own separate administrator program for configuration data that is not known to the host system. Inefficiencies are introduced in launching a second program, learning to navigate a new user interface, and generally adding to the complexity of gateway administration. While graphical user interfaces (GUIs), such as Microsoft Windows, provide a certain amount of uniformity that ameliorates the learning of a particular program, better solutions are constantly sought. In distributed system environments, where the administrator may be on a different computer than that on which the gateway is actually installed, configuration data that is foreign to the host system should be universally accessible from any location from which the system administrator program could be run.

SUMMARY AND OBJECTS OF THE INVENTION

It is a primary object of the invention to allow a single system administrator program to control a wide range of third-party components from a variety of vendors thereby performing administration tasks from a central location to streamline the work of a system administrator. Other objects of the invention include: interpreting foreign configuration data so that it may be understood by the host system in order to extend the host system user interface thereby allowing the ability to edit such foreign configuration data; extending the user interface of an existing program to encompass the ability to display and/or modify foreign data; and taking advantage of system level facilities, such as information replication, remote administration, etc., to further enhance and streamline system administration for third-party add-on components such as gateways. Additional objects and advantages of the invention will be set forth in the description which follows, and in part will be obvious from the description, or maybe learned by the practice of the invention. The objects and advantages of the invention maybe realized and obtained by means of the instruments and combinations particularly pointed out in the appended claims.

To achieve the foregoing objects, and in accordance with the invention as embodied and broadly described herein, the present invention provides a method, computer program product, and system for extending the capabilities of an existing process to store and display foreign data. The invention extends the capabilities of an existing process, such as a host computer system, to manipulate a block of foreign data. For example, the foreign data may be configuration data for a third-party component to an existing process, and the manipulation may be the display of the foreign data elements on a common user interface provided by the existing process. In many instances it is either useful or required for the host system and the third-party component to the host system to communicate through, or have access to, the information stored in the common data block. A common example of such an instance would be third-party gateway components for network e-mail systems. Such a situation arose in the context of Microsoft Exchange to allow the Microsoft Exchange Administrator program to set and modify the configuration and operational parameters of any gateway component now known or developed in the future.

For the existing process or host system to access and understand the foreign data block, the host system retrieves the foreign data block and passes the data block to a program extension module that is capable of interpreting the foreign data block and providing information back to the existing process. Such information includes extension module capabilities, function call entry points into the program extension module, user interface information for utilizing the host systems user interface, and association information for providing individual data element values found within the foreign data block that can be tied to the user interface, and other relevant information as necessary.

In this manner, a developer of a gateway or other third-party component to a host system will also develop the program extension module that will extend the capabilities of the existing process or host system to deal with the foreign configuration data of the gateway. Further, the program extension module will use the host system user interface to allow such configuration data to be displayed and modified through extending the host system user interface.

The program extension module is written to a predefined interface and convention and provides certain functionality to the existing process or host system in order to properly handle the foreign block of data. The functionality can be characterized as interpretation functionality for interpreting the foreign block of data and user interface functionality for designing the user interface according to the type of data found. The third-party program extension module developer will know the meaning of the foreign block of data and be able to communicate the information and provide the functionality as necessary through the actual interface provided by the host system designers.

One embodiment relies on a DLL (Dynamic Link Library) written by the third-party component developer to provide the needed functionality to the existing process on the host system. The existing process retrieves the block of foreign configuration data, passes it to the DLL through a predefined interface of function calls, displays the user interface, and sends relevant user interface events to the DLL. The DLL interprets the foreign data block, communicates necessary user interface information to the host system, communicates individual data elements and their association with the user interface to the host system and receives and processes relevant user interface events for the displayed data elements found in the foreign data block. In the event that the individual data elements are modified through the user interface, the host system will pass the modified data elements as well as relevant user interface events back to the DLL. The DLL will process the modified data elements, place them in the foreign data block, and send the now modified foreign data block to the host system for storage so that it is also accessible to the gateway or other third-party components running under the host system.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
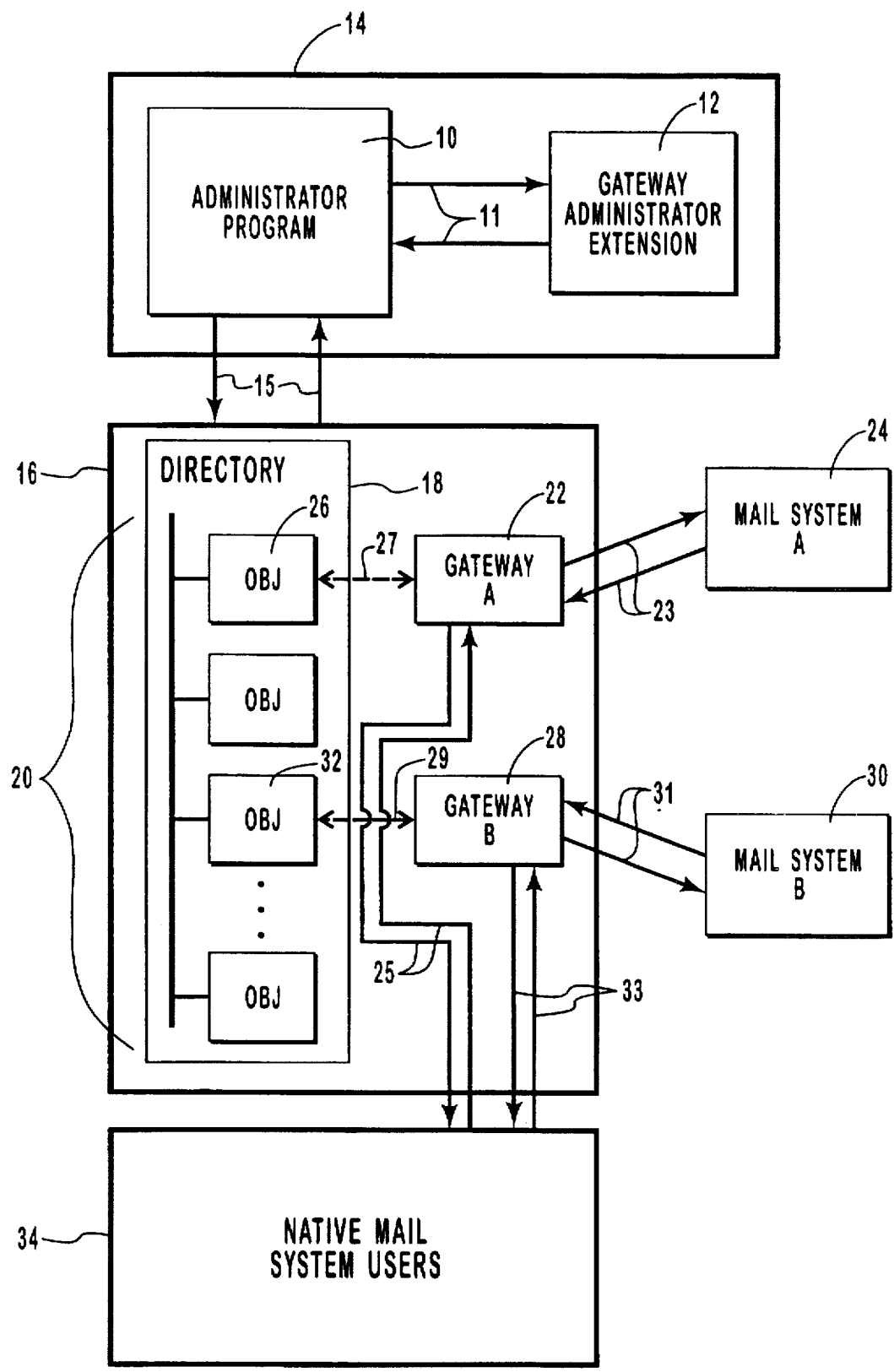
FIG. 1 is a functional block diagram showing an embodiment of the present invention wherein the third-party component is a gateway on a network e-mail system having a replicated directory.

As used herein, the term "process" is to be broadly interpreted to include any independently executed program code segment. Representative items specifically encompassed within the scope of this definition by way of example and not limitation include: application programs, processes created under an operating system, program extension modules such as Dynamic Link Libraries ("DLLs"), etc.

The term "communications network" to be interpreted broadly and includes, but is not limited to, local area networks, telecommunications networks, wide area networks, modem connections, etc. Typically, a communications network will comprise a physical component or physical connection that is made up of the wiring, interface cards, and other hardware combined with a specified communications protocol and associated software.

The term "storage means" is to be interpreted broadly to incorporate any type of device interfaceable to a computer that is used to memorize information and includes both long-term and short-term storage. Thus storage means would include though not be limited to cache memory, RAM, disk storage, tape storage, etc. Furthermore, storage means contemplates the entire system of storage incorporated by a computer in combination so that the RAM, cache, and disk drive together could be considered a storage means. Also, distributed storage systems found in networked systems also falls within the definition and includes a "directory" that may be automatically replicated across different computers in order to enhance accessibility. A storage means can also be logically partitioned so that items are stored in different media or in different parts of the same media. For example, a storage means comprising RAM and disk storage could be logically partitioned so that item A is stored in a portion of RAM (first partition), item B is stored in another portion of RAM (second partition), and item C is stored on disk (third partition). A storage location refers to a portion or portions of a storage means.

Embodiments within the scope of the present invention also include articles of manufacture comprising program storage means and having encoded therein program code means. Such program storage means can be any available media which can be accessed by a general purpose or special purpose computer. By way of example, and not limitation, such program storage means can comprise RAM, ROM, EPROM, CD-ROM or other optical disk storage, magnetic disk storage or other magnetic storage devices, or any other media which can be used to store the desired program code means and which can be accessed by a general purpose or special purpose computer. Combinations of any of these example program storage means are also contemplated within the scope of this invention. Program code means comprises, for example, executable instructions and data which cause a general purpose or special purpose computer to perform a specific function or functions.

The embodiment described in FIGS. 1–4 is an exemplary embodiment only and encompasses the present invention. Those skilled in the art will see many variations that may be made on this basic design that are well within the scope of the claims of the present invention.

Referring now to FIG. 1, a block diagram of an overall system is shown. An administrator program 10 having a gateway extension DLL 12 runs on computer 14. Gateway extension DLL 12 constitutes a program extension module to the administrator program 10. The administrator program 10 is used to administer an entire network mail system consisting of a number of different mail servers and a plurality of native mail system users. A program extension module is an executable code segment that interacts with an existing process. It is created after the existing process is finalized and one of its uses is to extend the capabilities of an existing process with additional information and functionality developed after development of the existing process has been completed. This requires that there be a predefined interface at the time the existing process is finalized so that the existing process knows how to access and communicate with program extension modules that may be developed in the future. In like manner, the program extension module must be written to the predefined interface so that the additional information and functionality is readily accessible to the existing process.

The administrator program 10 communicates with the gateway extension DLL 12 through a predefined interface of subroutine calls and a protocol for calling them. This communication is illustrated by arrows 11. Those skilled in the art will appreciate that the program extension module could be something other than a DLL and that the predefined interface could be something other than linked subroutine calls. For example, a program extension module may be a process running under a multi-tasking operating system that communicates and interacts with the existing process through message packets and a messaging protocol.

A server computer 16 contains a storage directory 18 that stores a plurality of objects 20 that are representative of the different system elements. The directory 18 may be replicated across a number of different server computers so that changes made to a particular object on a given computer will be replicated to the directories of all server computers. Changes to the objects 20 are typically made through the administrator program 10 as illustrated by arrows 15 and is done according to a defined protocol. It may be noted that the administrator program 10 may be running on another client computer and make changes to the directory 18 remotely or it may run on the server computer that contains directory 18 and make such changes directly without having any network overhead associated with remote operation.

A third-party e-mail gateway 22 is a third-party component that runs under the host system that manages directory 18 and runs on computer 16. Though the gateway 22 is shown running on computer 16, the gateway 22 may be running on another physically separate computer and still function as described. The gateway 22 allows mail messages from mail system 24 to be translated into a native format for communication to the native mail system users 34. This communication takes place through logical messaging links represented by arrows 23 and arrows 25, respectively. In like manner, native mail users 34 may use gateway 22 to send messages to users of mail system 24 again by the respective logical connections represented by arrows 23 and arrows 25.

Gateway 22 accesses (retrieves) an object 26 in the directory 18 as represented by arrow 27. Within object 26 is standard information understood by the administrator program for managing all types of gateway objects and additionally there is a block reserved for foreign data that can be used as desired by the gateway manufacturer. The format of this block of foreign data will not be known by the administrator program 10 but will be known and used appropriately by the gateway extension DLL 12 when accessed through the predefined interface. Those skilled in the art will appreciate that a wide variety of design choices exist on how to organize the required information for implementation of the present invention within the directory 18. The benefit of directory 18 is that it may be auto-replicated to many computers on a given site, making the information contained in the directory 18 and any modifications thereto widely available. Therefore, modifications may be made locally and information will be quickly and widely disseminated. These features and benefits will be discussed more fully in connection with FIG. 2.

The gateway object 26 associated with gateway 22 may contain all relevant information regarding gateway 22 including, but not limited to, common gateway information required and supported by the administrator program 10, such as the location of the gateway file, gateway extension information stored within a foreign block of data, the location of the extension DLL 12 (i.e., which computer, subdirectory in file system etc.), etc. Some embodiments within the scope of the claims may use multiple objects for storing the above mentioned information. Furthermore, the information stored in the directory 18 that will likely reside on many systems as opposed to information residing on a single computer may be augmented. For example, rather than a reference to the location of where the extension DLL 12 resides as a file (i.e., computer and subdirectory) the actual extension DLL 12 may be stored as an object or part of the gateway object 26 in order to increase its availability. Naturally, increasing the overall size of the directory 18 may have negative performance consequences and the implementation details are left for the system designer.

In like manner, gateway 28 for another mail system 30 will access information in object 32. This is done through logical communication links represented by arrows 29 and 31, respectively. Gateway 29 functions in the same manner as gateway 22 by allowing mail messages to be translated between the different formats thereby allowing the native mail users 32 to communicate with other mail systems 30. Again, this communication channel is represented by arrows 31 between mail system 30 and gateway 28 and arrows 33 between native mail system users 34 and gateway 28.

Figure 2:
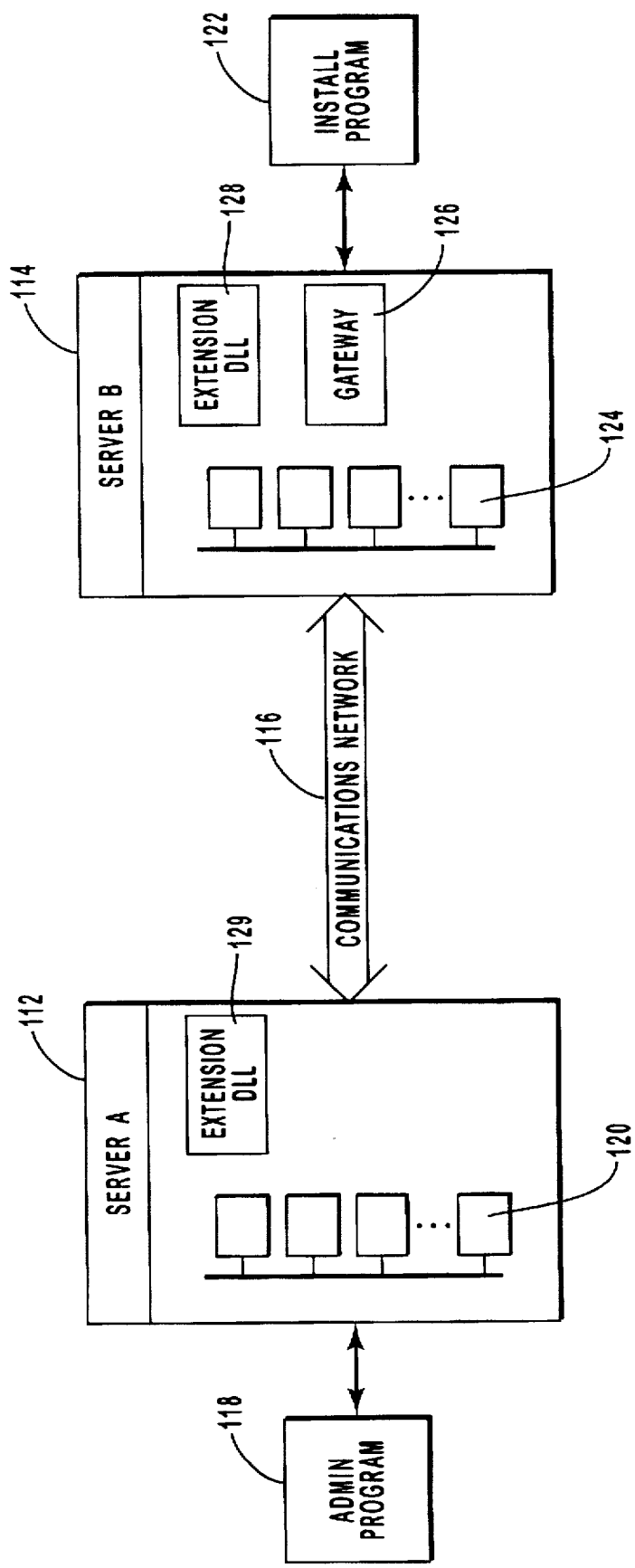
FIG. 2 is a block diagram showing capabilities of remote administration and how changes in the gateway specific configuration data are propagated through replication to the server running the gateway itself.

FIG. 2 is a block diagram showing how gateway extension information may be accessed and modified by an administrator program located on a different server than the actual gateway. Initially, an install program 122 copies the gateway files 126 and the extension DLL 128 onto the storage system of server B 114. The gateway files 126 are located on server B 114. Furthermore, the install program 122 will create gateway object 124 in the replicated directory, the replicated gateway object 124 containing common gateway configuration information, the location of the gateway files 126, the location of the extension DLL 128, and the foreign block of data associated with the gateway specific configuration data that is unknown to the network e-mail system. The extension DLL 128 is also replicated across the system. As mentioned previously more or less information may be stored in the replicated portion of server B as deemed appropriate by the system designers. Furthermore, the information may be distributed among one or more objects; however, the embodiment as described refers to one gateway object 124 in order to simplify the discussion. As shown, the extension DLL 128 and gateway object 124 are replicated, but those skilled in the art will see different ways of storing and replicating these system components without departing from the spirit of the present invention.

The entire directory of server B 114, including gateway object 124 and extension DLL 128, is replicated or duplicated on server A 112, server A 112 having gateway object 120 that is the equivalent of gateway object 124 and extension DLL 129 that is the equivalent of extension DLL 128. This is accomplished over the communications network represented by arrow 116 by which server A 112 and server B 114 are logically and electronically connected. The administrator program 118 interacts with the gateway object 120 in the replicated directory found on server A 112 in order to access the location of the extension DLL 129. The extension DLL 129 is loaded into and as part of the administrator program 118. With the extension DLL 129 loaded and running with the administrator program 118, the foreign data or extension block contained within gateway object 120 may be accessed and modified by the system administrator. Any modifications to gateway object 120 will be automatically replicated across the communications network 116 and reflected in gateway object 124 where the gateway program itself will have access to such modifications.

The actual operation of the administrator program 118 and its use of the extension DLL 128 will be explained in more detail in conjunction with FIGS. 4A and 4B. Both the administrator program 118 and the install program 122 may, and are likely to be, run on the respective servers, server A 112 and server B 114. However, each may run on a client machine and access their respective servers, server A 112 and server B 114, remotely.

Figure 3:
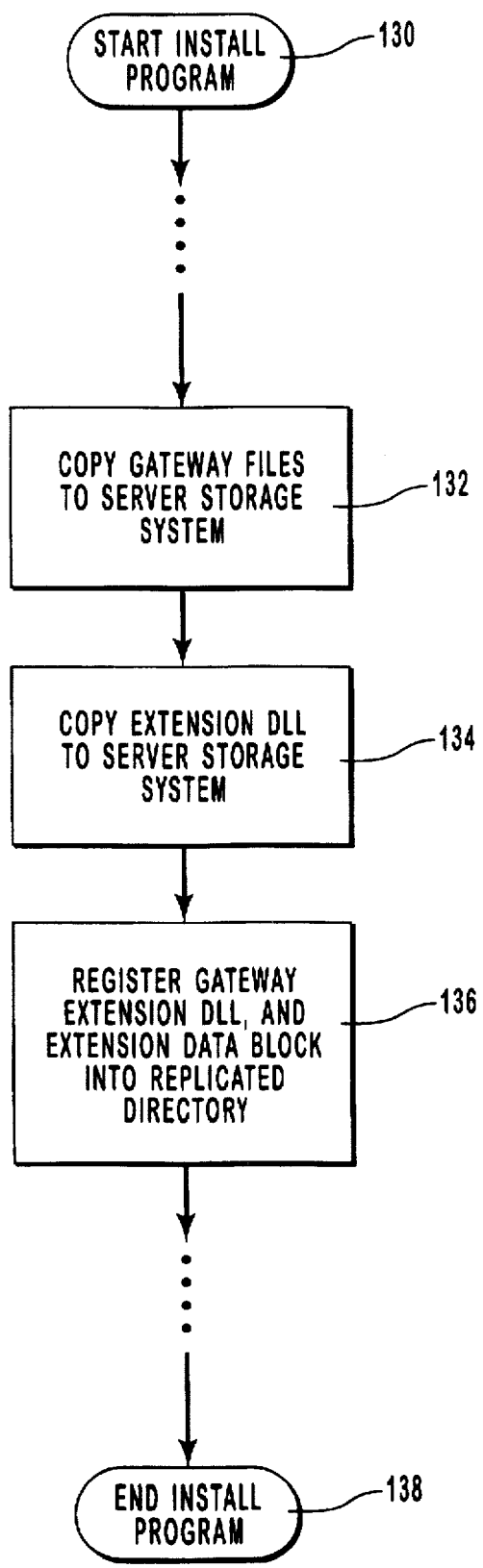
FIG. 3 is a flow chart showing a portion of the installation procedure for installing a gateway and the associated DLL.

The relevant portion of the install program is shown in the flow chart fragment of FIG. 3. The install program is started and otherwise initialized at step 130 and may include various steps. At step 132, the install program copies the gateway component files from the installation media onto the appropriate server storage system (e.g., server B 114 of FIG. 2). Additionally, the install program copies the extension DLL onto the server storage system at step 134.

The process of making the network mail system aware of the existence of the installed gateway is a process known as registration. This essentially contemplates creating an object into the replicated directory 136 containing the relevant gateway configuration information. This includes, among other things, the location (by computer, subdirectory, and filenames) of the gateway program, the location (by computer, subdirectory and filename) of the extension DLL, common configuration parameters that are required for all gateways, the foreign data block having the implementation specific configuration parameters that will be known to the gateway program, and all other relevant information for the management and administration of the gateway. Eventually, the install program will end at step 138 after completing other steps as necessary.

Figure 4A:
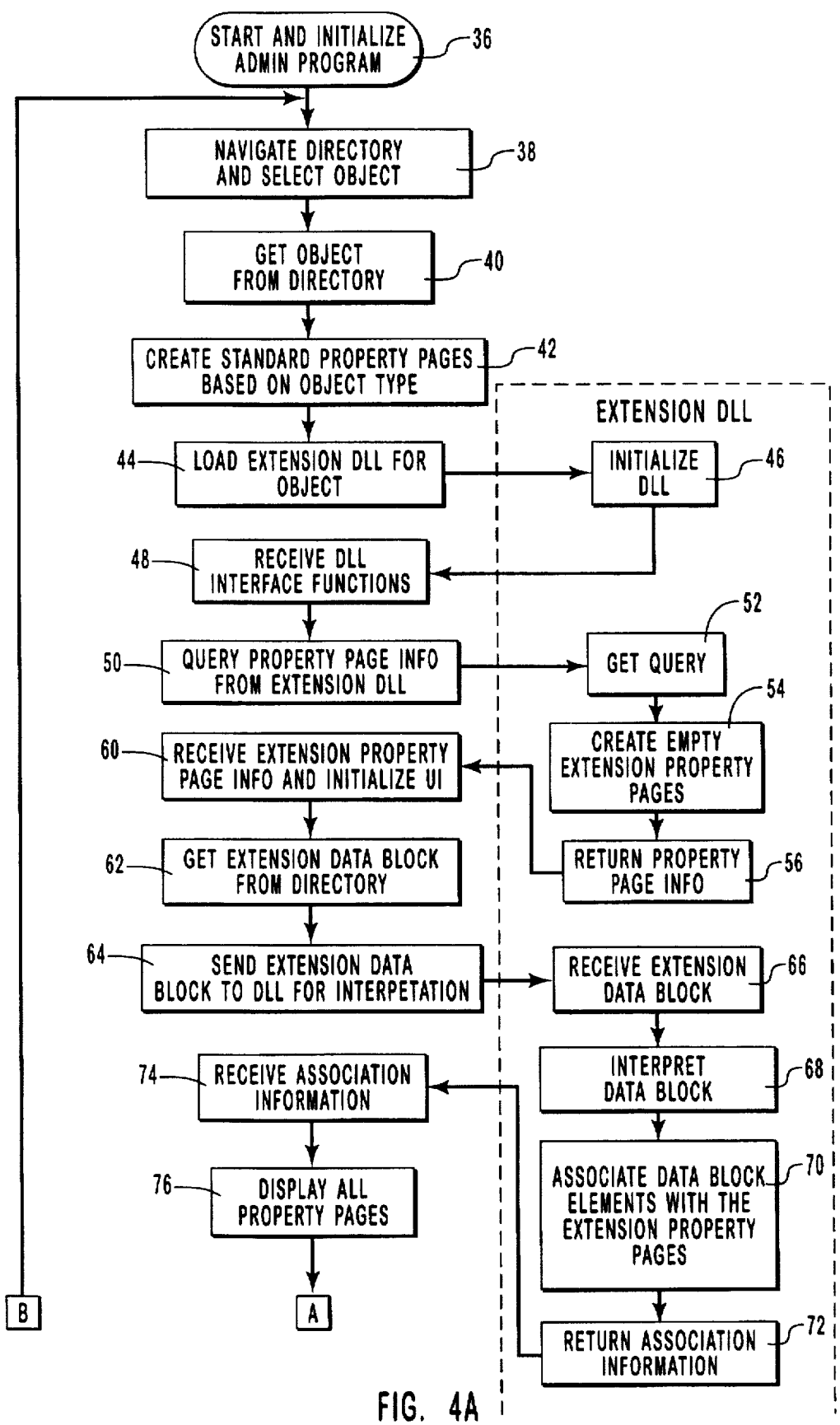
FIGS. 4A and 4B are a flow chart showing the interaction between the host system administrator program and a program extension module.
Figure 4B:
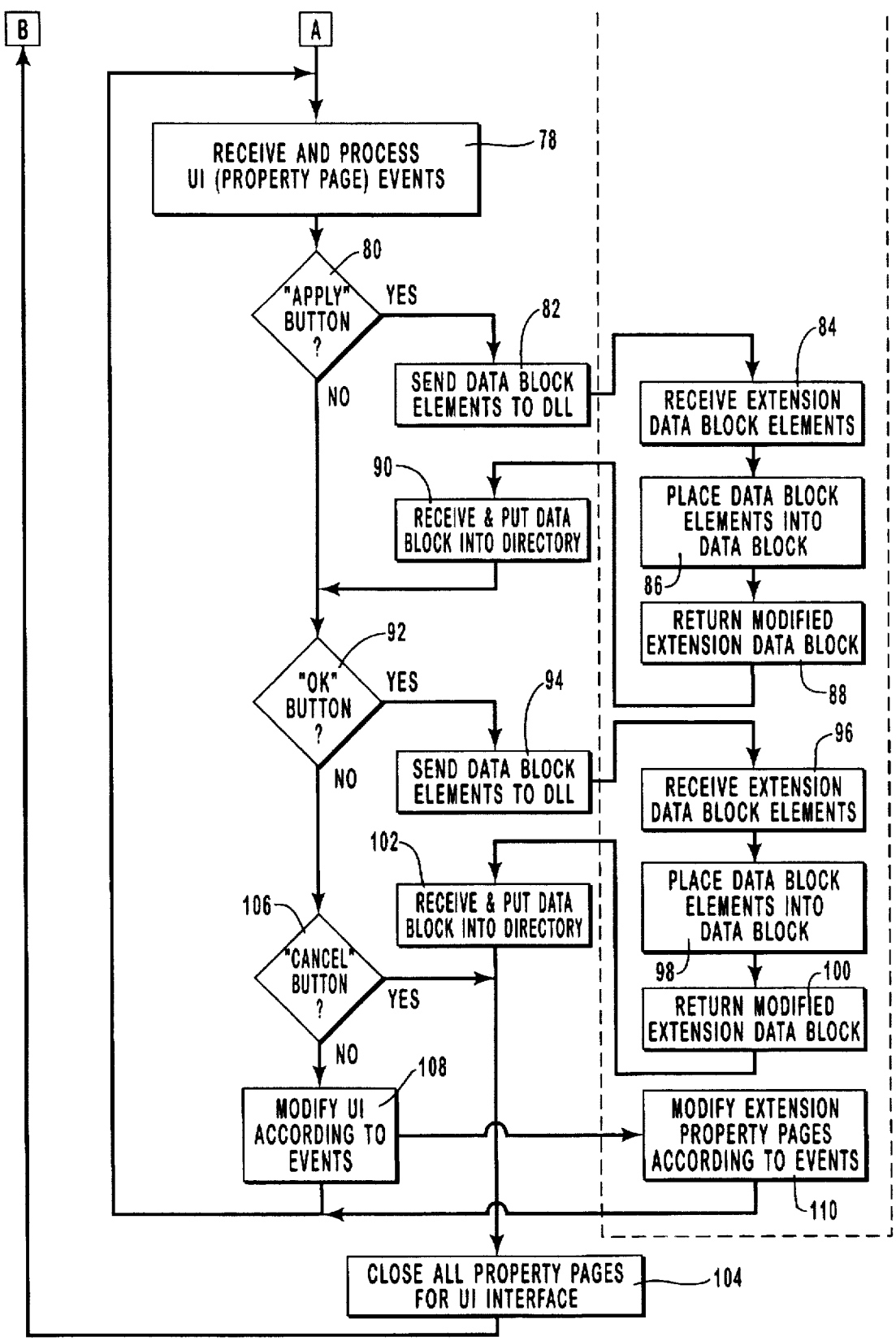

Referring now to FIG. 4A and 4B, a flow chart showing the interaction of the administrator program 10 and the gateway extension DLL 12 shows in greater detail the operation and extension of the administrator program 10 user interface and interpretation of the foreign data by the gateway extension DLL 12. The block diagram structure of FIG. 1 (rather than that of FIG. 2) is referenced throughout the explanation of FIGS. 4A and 4B. The administrator program 10 is started and initialized at step 36, bringing a user interface dialog box on a computer display means.

The system administrator navigates the storage directory 18 through the user interface and select one of the plurality of objects 20 at step 38. During the navigation and selection step 38, the system administrator looks for the object representing gateway 22 to the system which would correspond to gateway object 26 at FIG. 1.

The gateway object 26 is retrieved to the administrator program 10 at step 40 through a logical communications link as represented by arrows 15. It may be noted that the administrator program 10, which runs on computer 14, may run on the same computer where the storage directory 18 is located. When the administrator program 10 is running on the same machine as storage directory 18, logical connection as represented by arrows 15 still occurs, but there may not be use of a communications network.

The object modification user interface is then created based on the type of object. The user interface for the administrator program 10 displays on a computer display means a dialog box containing a number of property pages that may be selected by the system administrator, each page containing logically related properties. Only the currently selected property page will be viewed with the non-selected pages being available for selection with appropriate tab markers. The standard property pages are created based on the object type at step 42. In this instance, since gateway object 26 represents an entry for a gateway, then the standard property pages for a gateway object are created at step 42. Naturally, if another type of object were selected, the property pages appropriate to that type would be created.

Within the information contained in gateway object 26, the administrator program 10 is able to load the extension DLL 12 for gateway object 26 at step 44. Once the extension DLL 12 for gateway object 26 is loaded, the administrator program 10 calls an initialization subroutine within the DLL and the extension DLL 12 is initialized at step 46. Once initialized, the gateway extension DLL 12 returns the gateway extension DLL 12 interface function entry points to the administrator program 10 at step 48.

It may be noted, that FIGS. 4A and 4B represent the situation where a valid extension DLL exists and a different flow may occur when the extension DLL is not available, cannot be loaded, or is not properly initialized. Furthermore, those skilled in the art will appreciate that variations in the program flow and interactions between the administrator program and gateway extension DLL will occur in accordance with a selected and predetermined interface that may be different than that shown here but still fall within the scope of the claims.

The administrator program 10 now needs to know the user interface requirements in order to display the configuration parameters stored in the foreign data block portion of gateway object 26. The appropriate subroutine call is made at step 50 to query for property page information from the extension DLL 12. The query is received by the extension DLL at step 52 and the gateway extension DLL 12 creates the necessary empty extension property pages at step 54 by calling the correct set of subroutines according to the predefined interface. These calls are provided by the administrator program, the operating system, or combination thereof so that the user interface may be properly extended. The predefined interface is published so that the developers of gateway extension DLL 12 may take advantage of the provided functionality and properly link the extension DLL 12 to the existing administrator program 10. Those skilled in the art will note that either the extension DLL 12 or the administrator program 10 could create the actual user interface structure by calling the appropriate interface calls. For the administrator program 10 to correctly construct the user interface, however, the extension DLL 12 would need to communicate enough relevant information so that appropriate API calls could be made.

When completed, the gateway extension DLL 12 returns the property page information at step 56 which, in turn, is received by the administrator program 10 at step 60. The user interface is then initialized and prepared for display at step 60.

The foreign data block containing the configuration parameters for gateway 22 is retrieved from the storage directory 18 at step 62 by the administrator program 10. It may be noted that alternative embodiments may have the program extension module retrieve the foreign data block directly rather than through the administrator program.

Since the administrator program 10 does not understand the format or the information contained in the foreign data block portion of gateway object 26, the foreign data block is sent to the gateway extension DLL 22 at step 64 for proper interpretation.

The extension DLL 12 receives the foreign data block at step 66 and interprets that foreign data block at step 68. This interpretation requires understanding the format of the block to ascertain what information is contained therein and the boundaries of such information. It may be noted that some embodiments may provide specialized subroutines that tag or otherwise label the foreign data block found in gateway object 26. This may be useful when other programs or program extension modules wish to have some guidance or otherwise subdivide the foreign data block according to a known protocol. Naturally, those skilled in the art will undoubtedly see many variations in terms of packing and unpacking the foreign data block in order to facilitate the third-party developer's ability to quickly and efficiently write program extension modules such as the gateway extension DLL 12.

Once the foreign data block is interpreted at step 68, the interpretation breaking the foreign data block into its constituent data elements, the foreign data block data elements are associated with the appropriate areas of the gateway extension property pages at step 70. In this manner, the actual data values are displayed when the property pages are displayed. Finally, the extension DLL 12 returns the association information back to the administrator program 10 at step 72.

Upon receiving the information regarding the association of the foreign data block data elements with the gateway extension property pages at step 74, the administrator program 10 has all the information necessary to put the user interface into operation and displays all property pages at step 76.

Once the property pages are all initialized and displayed at step 76, the user interface event processing loop is entered as shown on FIG. 4B. The event loop receives and processes the user interface events at step 78. The display box containing the property pages includes three "buttons" that can be actuated by the user and that direct modifications to the foreign data block. Any modifications to the foreign data block data elements will be stored in a buffer until the "Apply" or "OK" button is depressed to initiate the foreign data block modification sequence explained hereafter. Depression of the "Cancel" button empties the buffer without saving before exiting the dialog box.

The event processing loop will determine whether the "Apply" button was depressed at step 80, whether the "OK" button was depressed at step 92, the "Cancel" button was depressed at step 106, or whether the particular event was used to simply modify the user interface in conventional fashion and should therefore be processed at step 108. All user interface events will fall within this loop and possible events include, but are not limited to, resizing, repositioning, changing data values, choosing another property page, depressing the "Apply," "OK," or "Cancel" button (explained in detail hereafter), or any other relevant user interface event Should the "Apply" button be depressed as determined at step 80, the foreign data block data elements in the extension property pages are sent back to the gateway extension DLL 12 at step 82. Upon receipt of the data elements at step 84, the gateway extension DLL 12 will reform the foreign data block by placing the data elements into their proper location within foreign data block at step 86. The foreign data block having the modified data elements is then returned to the administrator program 10 at step 88, and the administrator program places the modified foreign data block into the storage directory 18 at step 90. At this point, the modified data block is saved and the relevant information will be replicated across the entire system should the storage directory 18 be a replicated directory. Finally, the control is returned at the main loop and more events are processed.

Should the "OK" button be depressed as determined at step 92, the same sequence of events to save the modified extension data in the foreign block and placing the foreign block into the directory 18 as was done previously with respect to the "Apply" button being depressed is repeated. Namely, the data block elements are sent from the administrator program 10 to the gateway extension DLL 12 at step 94, where the gateway extension DLL 12 receives the extension data block data elements at step 96. Then data elements are reformed into the foreign extension data block and step 98 which is returned from the extension DLL 12 to the administrator program 10 at step 100.

After receiving the now modified foreign data block, the administrator program 10 places the foreign data block back into storage directory 18 at step 102, which in this case would be gateway data object 26. Since the "OK" button was depressed as determined at step 92, all property pages for the user interface are removed and deloading of the gateway extension DLL 12 takes place at step 104 before the program returns to the navigation and selection step 38.

Should the "Cancel" button be depressed as determined at step 106, no modification to the foreign data block is necessary so the flow proceeds directly to closing all property pages for the user interface and deloading the gateway extension DLL 12 at step 104 before returning to the navigation and selection step 38.

Should neither the "Apply" button, the "OK" button, nor the "Cancel" button be depressed, the user interface event is for modifying the value of a particular property or otherwise controlling the user interface. Such control events include switching property pages, resizing the dialog box, etc. This "normal" user interface processing occurs within the administrator program 10 at step 108 so that the user interface is modified according to the user interface event.

Naturally, many events regarding the gateway extension property pages will necessarily need to be handled by program code means supplied in the gateway extension DLL 12 and, if that is the case, the administrator program 10 will pass the event to the extension DLL 12 for processing at step 110. If extension block data element is modified, the data element is stored into a buffer until the "OK" or "Apply" button is depressed before being sent to the extension DLL 12 for processing as explained previously. It may be noted that some events may influence multiple property pages including some standard property pages at step 108 and some extension property pages at step 110, or both. Further those skilled in the art will appreciate that standard graphical user interface operating systems provide many of these facilities by allowing registration of callback functions for particular event handling according to user interface manipulation. This event processing loop beginning with the receipt of user interface events at step 78 will continue until either the "OK" button or the "Cancel" button is depressed as determined at steps 92 and 106, respectively.

As can be seen, the gateway extension DLL 12 contains two main functions, namely, providing information for creation of the user interface to accommodate the extension data block information (according to the predefined interface), and interpreting the extension data block in order to place the individual data elements within the user interface. Those skilled in the art will appreciate that this may be accomplished in a variety of different ways and that this exemplary embodiment represents only one of such ways that falls within the scope of the appended claims.

While the exemplary embodiment has been explained within the context of an e-mail gateway for a network mail system, the present invention has wide applicability towards any application that must understand a foreign block of data for any reason, particularly for extending a user interface to accommodate a block of data broken into individual data elements so that they may be modified using the same user interface as used for modifying data elements known to the host application.

Another example for applying the present invention would be for a document system allowing a document to be retrieved in any desired format so that a user's preferred word processor or other editor could be used. The system would have format translation modules written by the editor manufactures for translating the desired files for a native format to the particular editor format.

Again, besides general translation module configuration parameters needed by any translation module, there would also be editor-specific configuration information that would need to be stored as a block of foreign data not understood by the document system. A program extension module for the document system administrator program would provide the means for interpreting the foreign data block and the functionality necessary for the document system administrator program's user interface to be extended to allow modification of the foreign data elements. Those skilled in the art will appreciate that many other applications for the present invention exist not enumerated herein but encompassed within the scope of the appended claims.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In an electronic mail system having a server with at least one gateway through which electronic mail is translated from a native format used at the electronic mail system into a non-native format for transmission to another system and a mail system administrative program, a method for extending the user interface of the existing mail system administrative program so that the existing mail system administrative program may be used by third-party gateway developers for administering a gateway having data that is foreign to the mail system administrative program in order to relieve third-party gateway developers from having to develop separate gateway administrative programs, the method comprising:

retrieving at the existing mail system administrative program a data block containing information pertaining to a third-party gateway;

routing the data block to a program extension module provided by the third-party gateway developer, said program extension module interpreting the data block in order to identify pertinent user interface information and gateway-specific foreign data; and said existing mail system administrative program receiving said pertinent user interface information and said gateway-specific foreign data from the program extension module and thereafter automatically generating a user interface containing the gateway-specific foreign data that is not known to the mail system administrative program so that the gateway can be administered using the existing mail system administrative program without creating a separate gateway administrative program.

2. A method as recited in claim 1 allowing changes made to the gateway-specific foreign data in response to mail system administrative program user interface operation to be stored in the block of data, the method further comprising:

communicating the gateway-specific foreign data changes to the program extension module; and the program extension module placing the changes into the block of data in the original format.

3. A method as recited in claim 1 wherein the block of data is stored in a storage directory that is replicated across a plurality of different computers, the storage directory accessible to the mail system administrative program.

4. A method as recited in claim 1 wherein routing and receiving by the existing mail system administrative program is done through a defined interface comprising a set of software procedure calls.

5. A method as recited in claim 1 wherein routing and receiving by the existing mail system administrative program is done through a defined interface comprising a messaging convention and protocol.

6. In an electronic mail system having a server with at least one gateway through which electronic mail is translated from a native format used at the electronic mail system into a non-native format for transmission to another system and a mail system administrative program, a method for extending the user interface of an existing mail system administrative program with the ability to display gateway-specific data elements stored in a data block whose format is unreadable to the existing mail system administrative program in order to relieve third-party gateway developers from having to develop separate gateway administrative programs, the method comprising the steps of:

retrieving a data block from a storage location;

routing the data block to a program extension module for interpretation, the program extension module and the existing mail system administrative program communicating through a defined interface;

the existing mail system administrative program receiving from the program extension module user interface information through the defined interface, the existing mail system administrative program using the user interface information to automatically generate a user interface for the gateway specific data elements; and the existing mail system administrative program receiving from the program extension module the gateway-specific data elements contained in the data block and information regarding their placement in the automatically created user interface, the data elements and placement information received through the defined interface so that the gateway may be administered through the automatically created user interface without the creation of a separate gateway administrative program.

7. A method as recited in claim 6 allowing gateway-specific data element changes to be stored in the block of data in response to user interface operation, the method further comprising the steps of:

communicating the gateway-specific data element changes to the program extension module through the defined interface;

the program extension module placing the gateway-specific data element changes into the data block; and storing the data block in the storage location.

8. A method as recited in claim 6 wherein the storage location is a directory that is replicated across a plurality of different machines.

9. A method as recited in claim 6 wherein the data block is retrieved by the mail system administrative program.

10. A method as recited in claim 6 wherein the data block is retrieved by the program extension module.

11. A method as recited in claim 6 wherein the defined interface is a set of software procedure calls.

12. A method as recited in claim 6 wherein the defined interface is a messaging convention and protocol.

13. In an electronic mail system having a server with at least one gateway through which electronic mail is translated from a native format used at the electronic mail system into a non-native format for transmission to another system and a mail system administrative program, a method for extending the user interface of an existing mail system administrative program with the ability to display gateway-specific data elements stored in a data block whose format is unreadable to the existing mail system administrative program in order to relieve third-party gateway developers from having to develop separate gateway administrative programs, the method comprising the steps of:

the existing mail system administrative program retrieving a data block from a storage location in a directory of information replicated across a plurality of network machines;

routing the data block to a program extension module for interpretation, the program extension module and the existing mail system administrative program communicating through a defined interface of procedure calls;

the existing mail system administrative program receiving from the program extension module user interface information through the defined interface, the existing mail system administrative program using the user interface information to automatically generate a user interface for the gateway specific data elements;

the existing mail system administrative program receiving from the program extension module the gateway-specific data elements contained in the data block and information regarding their placement in the automatically created user interface, the data elements and placement information received through the defined interface so that the gateway may be administered through the automatically created user interface without the creation of a separate gateway administrative program; and for desired changes made to the gateway-specific data elements through operation of the user interface, storing those gateway-specific data element changes further comprising the steps of:

communicating the gateway-specific data element changes to the program extension module through the defined interface;

the program extension module placing the gateway-specific data element changes into the data block; and storing the data block in the storage location.

14. A computer program product for use in an electronic mail system having a server with at least one gateway through which electronic mail is translated from a native format used at the electronic mail system into a non-native format for transmission to another system and a mail system administrative program, and that employs a method for extending the user interface of the mail system administrative program with the ability to display gateway-specific data elements stored in a data block whose format is unreadable to the mail system administrative program in order to relieve third-party gateway developers from having to develop separate gateway administrative programs, the computer product comprising:

a computer usable medium that carries computer readable program code means for allowing the ability to display data elements stored in a data block whose format is unreadable;

program code means for retrieving a data block from a storage location;

program code means for routing the data block to a program extension module for interpretation, the program extension module communicating through a defined interface;

program code means for receiving from the program extension module user interface information through the defined interface and using the user interface information to automatically generate a user interface for the gateway-specific data elements; and program code means for receiving from the program extension module the gateway-specific data elements contained in the data block and information regarding their placement in the automatically created user interface, the data elements and placement information received through the defined interface so that the gateway may be administered through the previously created user interface without the creation of a separate gateway administrative program.

15. A program product as described in claim 14 allowing desired changes made to the data elements through operation of the user interface to be stored, further comprising:

program code means for communicating the data element changes to the program extension module through the defined interface to allow the program extension module to place the changes into the data block;

program code means for receiving from the program extension module the data block; and program code means for storing the data block in the storage location.

16. A program product as described in claim 14 wherein the storage location is in a directory of information replicated across a plurality of different networked machines.

17. A program product as described in claim 14 wherein the data block is retrieved by the program extension module.

18. A program product as described in claim 14 wherein the defined interface is a set of procedure calls.

19. A program product as described in claim 14 wherein the defined interface is a messaging convention and protocol.

20. A computer program product for use in an electronic mail system having a server with at least one gateway through which electronic mail is translated form a native format used at the electronic mail system into a non-native format for transmission to another system and a mail system administrative program, and that employs a method for extending user interface of the mail system administrative program with the ability to display and store changes to gateway-specific data elements stored in a data block whose format is unreadable to the mail system administrative program in order to relieve third-party gateway developers from having to develop separate gateway administrative programs, the computer product comprising:

a computer usable medium that carries computer readable program code means for allowing the ability to display data elements stored in a data block whose format is unreadable;

program code means for retrieving a data block from a storage location in a directory of information replicated across a plurality of network machines.

program code means for routing the data block to a program extension module for interpretation, the program extension module communicating through a defined interface of procedure calls;

program code means for receiving from the program extension module user interface information through the defined interface and using the user interface information to automatically generate a user interface for the gateway-specific data elements;

program code means for receiving from the program extension module the gateway-specific data elements contained in the data block and information regarding their placement in the automatically created user interface, the data elements and placement information received through the defined interface so that the gateway may be administered through the previously created user interface without the creation of a separate gateway administrative program; and for desired changes made to the gateway-specific data elements through operation of the automatically created user interface, program code means for storing those changes comprising:

program code means for communicating the gateway-specific data element changes to the program extension module through the defined interface to allow the program extension module to place the gateway-specific data element changes into the data block;

program code means for receiving from the program extension module the data block; and program code means for storing the data block in the storage location.

* * * * *

UNITED STATES PATENT AND TRADEMARK OFFICE
CERTIFICATE OF CORRECTION

PATENT NO. : 5,781,902
DATED : Jul. 14, 1998
INVENTOR(S) : Edward Paul Waszkiewicz It is certified that error appears in the above-identified patent and that said Letters Patent is hereby corrected as shown below:

Abstract, 10th line down, after "defined" delete "interface"

Abstract, 16th line down, after "modified by" insert --the--

Col. 1, line 41, after "native" change "networks" to --network's--

Col. 4, line 11, after "these" change "drawing" to --drawings--

Signed and Sealed this

Twenty-first Day of December, 1999

Attest:

Q. TODD DICKINSON

*Attesting Officer*    *Acting Commissioner of Patents and Trademarks*